US009325895B2

(12) United States Patent
Kwon (10) Patent No.: US 9,325,895 B2
(45) Date of Patent: Apr. 26, 2016

(54) DIGITAL PHOTOGRAPHING APPARATUS AND CONTROL METHOD THEREOF

(75) Inventor: O-hyun Kwon, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 543 days.

(21) Appl. No.: 13/591,405

(22) Filed: Aug. 22, 2012

(65) Prior Publication Data

US 2013/0135442 A1 May 30, 2013

(30) Foreign Application Priority Data

Nov. 28, 2011 (KR) ........................ 10-2011-0125216

(51) Int. Cl.
*H04N 5/232* (2006.01)
*H04N 13/02* (2006.01)

(52) U.S. Cl.
CPC ....... *H04N 5/23212* (2013.01); *H04N 5/23293* (2013.01); *H04N 13/0239* (2013.01); *H04N 13/0296* (2013.01)

(58) Field of Classification Search
CPC .................................................. H04N 13/02
USPC .......................................................... 348/47
See application file for complete search history.

(56) References Cited

U.S. PATENT DOCUMENTS

| 8,717,490 B2* | 5/2014 | Imamura ........................ 348/345 |
| 2004/0201699 A1* | 10/2004 | Parulski et al. .......... 348/207.99 |
| 2006/0290792 A1* | 12/2006 | Nikkanen et al. ........... 348/240.2 |
| 2009/0028385 A1* | 1/2009 | Cavallaro et al. ............. 382/103 |
| 2010/0157127 A1 | 6/2010 | Takayanagi et al. |
| 2011/0242346 A1 | 10/2011 | Ego |
| 2012/0026277 A1* | 2/2012 | Malzbender et al. ...... 348/14.07 |
| 2012/0327218 A1* | 12/2012 | Baker et al. .................... 348/135 |

FOREIGN PATENT DOCUMENTS

| EP | 1 471 455 A2 | 10/2004 |
| JP | 2008-294785 A | 12/2008 |
| KR | 10-0938195 B1 | 1/2010 |

OTHER PUBLICATIONS

Anonymous, "Depth Map—Wikipedia, the free encyclopedia," <https://en.wikipedia.org/w/index.php?title=Depth_map&oldid=443358422>, Aug. 6, 2011, 3 pages. (retrieved on Aug. 24, 2015).
Extended European Search Report issued for related application EP 12188317.7, Sep. 2, 2015, 7 pages.

* cited by examiner

*Primary Examiner* — Jefferey Harold
*Assistant Examiner* — Justin Sanders
(74) *Attorney, Agent, or Firm* — Drinker Biddle & Reath LLP (57) ABSTRACT

A digital photographing apparatus that recommends a suitable auto focus (AF) candidate area to a user before photographing, allows a user to select an AF area or automatically selects the AF area, and allows a user to conveniently and accurately capture a desired image, and a method of controlling the digital photographing apparatus are disclosed. A method is provided that includes calculating information about a distance to an object existing in an image stereoscopically input through a first lens and a second lens; matching the information about the distance to red green blue (RGB) information of the image; displaying a plurality of AF candidate areas on the image based on the matched RGB information; and capturing an image centered on an AF candidate area having a first priority when a photographing button is pressed.

20 Claims, 8 Drawing Sheets

DIGITAL PHOTOGRAPHING APPARATUS AND CONTROL METHOD THEREOF

CROSS-REFERENCE TO RELATED PATENT APPLICATION

This application claims the priority benefit of Korean Patent Application No. 10-2011-0125216, filed on Nov. 28, 2011, in the Korean Intellectual Property Office, which is incorporated herein in its entirety by reference.

BACKGROUND

1. Field of the Invention

The invention relates to a digital photographing apparatus for capturing stereo images and a control method thereof.

2. Description of the Related Art

Generally, in order to perform an auto focusing (AF) operation in a digital photographing apparatus, a user moves the apparatus to place an object to be in focus in a location of a fixed AF area, or the digital photographing apparatus finds an area having a relatively strong intensity edge in an image to recommend the area as an AF area for performing an AF operation.

However, while performing an AF operation using a fixed AF area, an object to be in focus in an image needs to be placed in a fixed location of a composition of a picture, and a user needs to reset a composition of a picture due to the fixed AF area. Furthermore, an object that a user does not wish to be in focus may be recommended as an AF area.

SUMMARY

The invention provides a digital photographing apparatus that recommends one or more suitable AF candidate areas to a user before photographing, allows a user to select one or more AF areas or automatically selects one or more AF areas, and allows a user to conveniently and accurately capture a desired image.

The invention also provides a control method of the digital photographing apparatus.

According to an aspect of the invention, there is provided a method of controlling a digital photographing apparatus, the method including: calculating information about a distance to an object existing in an image stereoscopically input through a first lens and a second lens; matching the information about the distance to red green blue (RGB) information of the image; displaying a plurality of AF candidate areas on the image based on the matched RGB information; and capturing an image centered on an AF candidate area having a first (e.g., highest) priority when a photographing button is pressed.

In the calculating of the information about the distance, the image may be obtained by mixing first and second images input respectively through the first and second lenses.

The calculating of the information about the distance may include displaying the distance information from a short distance to a long distance using gray levels 0 through 255.

The matching of the information about the distance to the RGB information of the image may include: dividing the image into a plurality of blocks; calculating RGB average values of pixels existing in each of the plurality of blocks; and including the information about the distance in the RGB average values of the pixels.

The displaying of the plurality of AF candidate areas may include displaying the plurality of AF candidate areas on the image obtained by mixing first and second images respectively input through the first and second lenses.

The displaying of the plurality of AF candidate areas may include generating the plurality of AF candidate areas based on sizes of objects and distances to the objects.

Priorities may be assigned in descending order from an AF candidate area including an object that has the largest size and to which a distance is shortest to an AF candidate area including an object that has the smallest size and to which a distance is longest.

An AF candidate area having the first priority may be displayed differently from the other AF candidate areas.

According to an aspect of the invention, there is provided a method of controlling a digital photographing apparatus, the method including: calculating information about a distance to an object existing in an image stereoscopically input through a first lens and a second lens; matching the information about the distance to RGB information of the image; displaying a plurality of AF candidate areas on the image based on the matched RGB information; receiving a selection of any one of the displayed plurality of AF candidate areas; and capturing an image centered on the selected AF candidate area when a photographing button is pressed.

In the calculating of the information about the distance, the image may be an image obtained by mixing first and second images input through the first and second lenses.

The calculating of the information about the distance may include displaying the distance information from a short distance to a long distance using gray levels 0 through 255.

The displaying of the plurality of AF candidate areas may include displaying the plurality of AF candidate areas on the image obtained by mixing first and second images respectively input through the first and second lenses.

The matching of the information about the distance to the RGB information of the image may include: dividing the image into a plurality of blocks; calculating RGB average values of pixels existing in each of the plurality of blocks; and including the information about the distance in the RGB average values of the pixels.

The displaying of the plurality of AF candidate areas may include generating the plurality of AF candidate areas based on sizes of objects and distances to the objects.

Priorities may be assigned in descending order from an AF candidate area including an object that has the largest size and to which a distance is shortest to an AF candidate area including an object that has the smallest size and to which a distance is longest.

An AF candidate area having the first priority may be displayed differently from the other AF candidate areas.

According to an aspect of the invention, there is provided a digital photographing apparatus including: a distance calculator to calculate information about a distance to an object existing in an image stereoscopically input through a first lens and a second lens; a matching unit to match the information about the distance to RGB information of the image; a generation unit to generate a plurality of AF candidate areas from the image based on the matched RGB information and then for displaying the plurality of AF candidate areas; and a controller to capture an image centered on any one of the plurality of AF candidate areas when a photographing button is pressed.

The distance calculator may display distance information from a short distance to a long distance using gray levels 0 through 255.

The generation unit may generate the plurality of AF candidate areas based on sizes of objects and distances to the objects, and may assign priorities in descending order from an AF candidate area including an object that has the largest size and to which a distance is shortest to an AF candidate area including an object that has the smallest size and to which a distance is longest.

The controller may capture an image centered on an AF candidate area having a first priority when a photographing button is pressed, or when the photographing button is pressed after any one of the displayed AF candidate areas is selected, the controller may capture an image centered on the selected AF candidate area.

Using the digital photographing apparatus and the control method thereof, it is possible to generate a photographing result that more accurately reflects an intention of a user by allowing the user to easily select a desired AF area.

BRIEF DESCRIPTION OF THE DRAWINGS

The above and other features and advantages of the invention will become more apparent in review of detail exemplary embodiments thereof with reference to the attached drawings, in which.

DETAILED DESCRIPTION

The invention will now be described more fully with reference to the accompanying drawings, in which exemplary embodiments of the invention are shown. Like reference numerals in the drawings denote like elements, and thus repeated descriptions thereof will be omitted.

Figure 1:
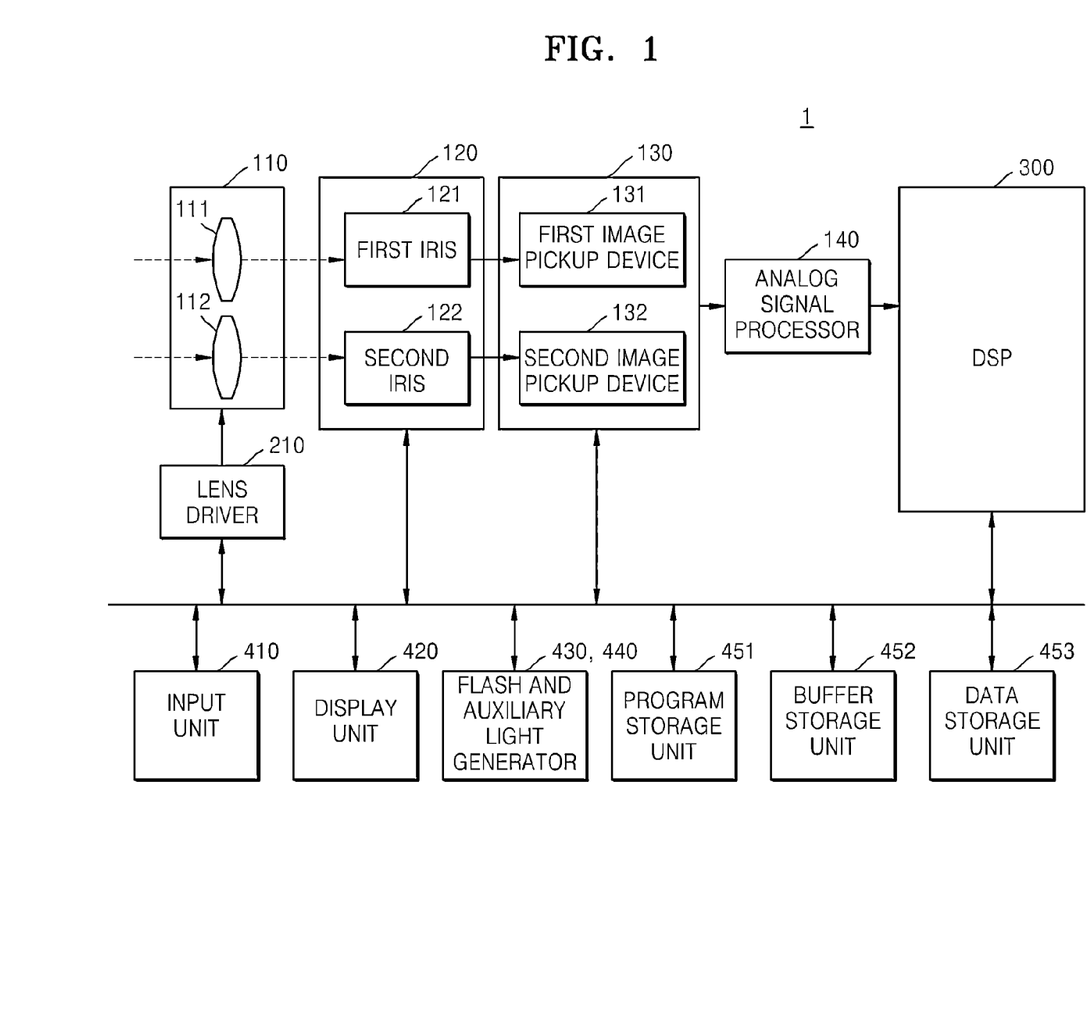
FIG. 1 is a block diagram of a digital photographing apparatus, according to an embodiment of the invention.

FIG. 1 is a block diagram of a digital photographing apparatus, according to an embodiment of the invention. In FIG. 1, a digital camera 1 is described as an embodiment of the digital photographing apparatus. However, the digital photographing apparatus is not limited to the digital camera 1 shown in FIG. 1 and may also be applied to other digital apparatuses such as compact digital cameras, single-lens reflex cameras, hybrid cameras having advantages of a compact digital camera and a single-lens reflex camera, camera phones, personal digital assistants, portable multimedia players, and any other device capable of performing photographing.

Referring to FIG. 1, the digital camera 1 may include a lens unit 110, a lens driver 210, an iris 120, an image pickup device 130, an analog signal processor (ASP) 140, a digital signal processor (DSP) 300, an input unit 410, a display unit 420, a flash 430, an auxiliary light generator 440, a program storage unit 451, a buffer storage unit 452, and a data storage unit 453.

The lens unit 110 concentrates an optical signal. In the current embodiment, the lens unit 110 includes a first lens 111 and a second lens 112. The first lens 111 is used to capture a left image of a subject, and the second lens 112 is used to capture a right image of the subject. The first lens 111 and the second lens 112 may be included in the digital camera 1 or assembled from the outside.

The iris 120 adjusts the intensity of incident light by adjusting an open/close degree thereof. In the current embodiment, the iris 120 includes a first iris 121 and a second iris 122. The first iris 121 adjusts the intensity of incident light by adjusting an open/close degree with respect to the first lens 111, and the second iris 122 adjusts the intensity of incident light by adjusting an open/close degree with respect to the second lens 112.

The lens driver 210 and an iris driver (not shown) drive the lens unit 110 and the iris 120 by receiving a control signal from the DSP 300, respectively. The lens driver 210 may be realized by a voice coil motor (VCM), a piezo motor, or a stepping motor. For example, when the lens driver 210 is realized by a VCM, the VCM may be assembled at a position surrounding the lens unit 110 to move the left and right lenses 111 and 112. The lens driver 210 may further include a motor driver (not shown) for driving the VCM in addition to the VCM. The iris driver adjusts an open/close degree of the iris 120, and in particular, performs operations such as AF, auto exposure (AE) compensation, focus change, and subject depth adjustment by adjusting an iris value (F number).

An optical signal passing through the lens unit 110 forms optical images of a subject on a light-reception face of the image pickup device 130. In the current embodiment, the image pickup device 130 includes a first image pickup device 131 and a second image pickup device 132. The first image pickup device 131 forms a first electrical image of an optical signal passing through the first lens 111, and the second image pickup device 132 forms a second electrical image of an optical signal passing through the second lens 112. The image pickup device 130 may use a charge coupled device (CCD), a complementary metal oxide semiconductor image sensor (CIS), or a high-speed image sensor for converting an optical signal to an electric signal. The image pickup device 130 may adjust its sensitivity under a control of an image pickup device controller (not shown). The image pickup device controller may control the image pickup device 130 in response to a control signal automatically generated by an image signal input in real-time or a control signal manually input by a manipulation of a user. The digital camera 1 may further include a shutter (not shown) as a mechanical shutter in which a cover moves upwards and downwards.

The ASP 140 generates digital image signals by performing noise reduction, gain adjustment, waveform standardization, and analog-to-digital conversion of analog electrical signals provided from the image pickup device 130.

The input unit 410 is a device for inputting a control signal by the user. The input unit 410 may include a shutter release button for opening and closing the shutter to expose the image pickup device 130 to light for a predetermined time, a power button for supplying power, a wide-angle zoom button and a telescopic zoom button for widening or narrowing an angle of view in response to a corresponding input, character input keys, a mode selection button for selecting a mode such as a camera mode and a play mode, a white balance setting function selection button, and an exposure setting function selection button. The shutter release button may be divided into first and second shutter release buttons or positions. When the first shutter release button is pressed, the digital camera 1 performs a focusing operation and adjusts the intensity of light. Then, the user may press the second shutter release button, and accordingly, the digital camera 1 may capture an image. Although the input unit 410 may have a form of various key buttons, the input unit 410 is not limited thereto and may be implemented in any user-input form, such as a switch, a keyboard, a touch pad, a touch screen, or a remote control.

The display unit 420 may include a liquid crystal display (LCD), an organic luminescence display panel, or a field emission display (FED) and display state information of the digital camera 1 or a captured image.

The flash 430 is a device for temporarily illuminating a subject by temporarily emitting a bright light onto the subject when the subject is photographed in a dark place, and flash modes include an automatic flash mode, a compulsive light emission mode, a light emission prohibition mode, a red-eye mode, and a slow synchro mode. The auxiliary light generator 440 provides auxiliary light to a subject so that the digital camera 1 can AF on the subject in a quick and correct manner when the intensity of light is not sufficient or when photographing is performed at night.

The digital camera 1 also includes the program storage unit 451 for storing programs such as an operation system and applications for controlling the digital camera 1, the buffer storage unit 452 for temporarily storing data required during a computation or result data, and the data storage unit 453 for storing image files including image signals and various kinds of information required for the programs.

The digital camera 1 also includes the DSP 300 for processing digital image signals input from the ASP 140. and controlling the components of the digital camera 1 in response to external input signals. The DSP 300 may mix first and second input image signals, and perform image signal processing for image quality enhancement of a mixed image such as noise reduction, gamma correction, color filter array interpolation, color matrix, color correction, and color enhancement. In addition, the DSP 300 may generate an image file by compressing image data generated by performing the image signal processing for image quality enhancement. In addition, the DSP 300 may restore (decompress) image data from an image file. A compressed image file may be stored in the data storage unit 453. In addition, the DSP 300 may generate control signals for controlling a zoom change, a focus change, and AE compensation by executing programs stored in the program storage unit 451 and provide the generated control signals to the lens driver 210, the iris driver, and the image pickup device controller to respectively control the lens unit 110, the iris 120, and the image pickup device 130.

In the current embodiment, the DSP 300 performs stereo matching for a first image and a second image. Human beings may see things in three dimensions using a time difference between two eyes, and the digital camera 1 has a time difference characteristic with respect to left and right sides in which an image is captured differently by the first and second lens 111 and 112 having a constant distance therebetween. Thus, the DSP 300 performs the stereo matching, wherein a position difference, i.e., a difference between the two sides, is extracted by detecting that a pattern located at a specific position in a first image captured via the first lens 111 is located at a different position in a second image captured via the second lens 112, and then the first image and the second image are matched by correcting the position difference with respect to any one image.

According to the current embodiment, the DSP 300 calculates information about a distance to an object existing in an image input through the first lens 111 and the second lends 112, and generates a plurality of AF candidate areas from the image after matching the calculated distance information to RGB information of the image and then displays the plurality of AF candidate areas. After this, when a photographing button is pressed, an image is captured centered on an AF candidate area having a first priority. In addition, when a photographing button is pressed after any AF candidate area of the displayed AF candidate areas is selected; an image is captured centered on the selected AF candidate area. For this, as illustrated in FIG. 2, the DSP 300 may include a distance calculator 310, a matching unit 320, a generation and display unit 330, and a controller 340, and a detailed operation of the DSP 300 is described in detail with reference to FIGS. 2 to 10.

Figure 2:
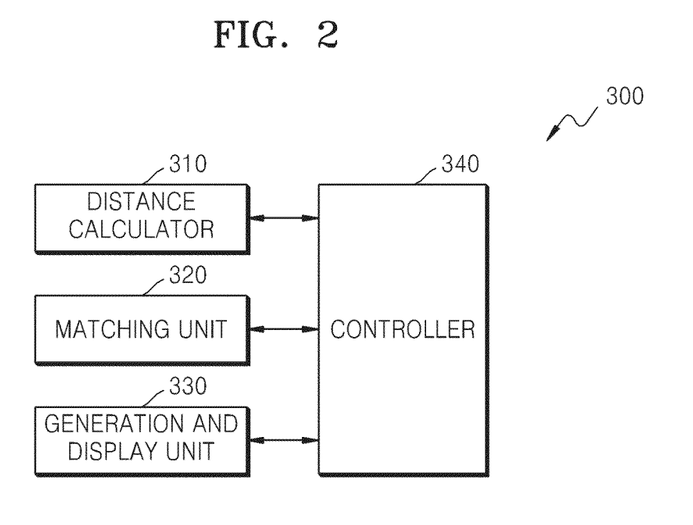
FIG. 2 is a detailed block diagram of the digital signal processor of FIG. 1.

FIG. 2 is a detailed block diagram of the DSP 300 of FIG. 1.

Referring to FIG. 2, the DSP 300 includes the distance calculator 310, the matching unit 320, the generation and display unit 330, and the controller 340. The distance calculator 310 calculates a distance to an object existing in an image input through the first lens 111 and the second lens 112. That is, the distance calculator 310 calculates a distance from the camera 1 to a real position of the object.

Figure 3:
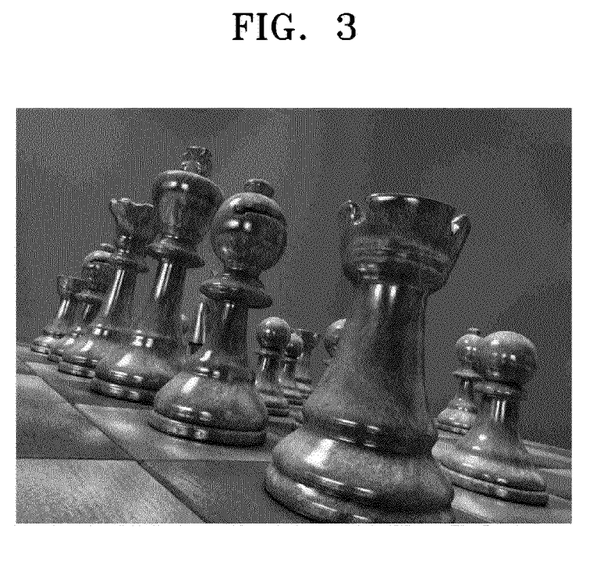
FIG. 3 is a diagram illustrating an image input through any one of a first lens and a second lens.

In FIG. 3, an image that is used for calculating a distance is illustrated. The image may be an image obtained by mixing first and second images input through the first and second lenses 111 and 112 (i.e., stereoscopically input via the first and second lenses 111 and 112), or may be an image input through any one of the first and second lenses 111 and 112. In the current embodiment, it is assumed that the image illustrated in FIG. 3 is the first image input through the first lens 111.

Figure 4:
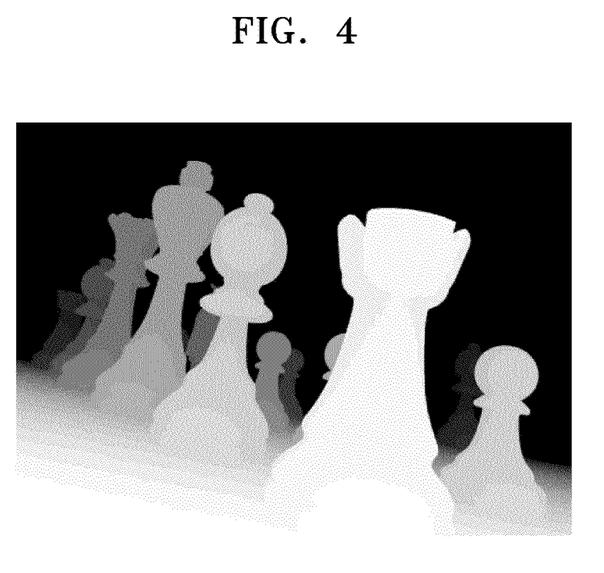
FIG. 4 is a diagram illustrating distance information of an object represented using gray levels.

The distance calculator 310 calculates real distance information of an object existing in the first image. For example, the distance calculator 310 calculates distance information through various methods such as calculating distance information by sending an ultrasonic signal from the camera 1 to the object and then receiving a returned signal. The distance calculator 310 generates a distance information map by calculating distance information about the first image illustrated in FIG. 3. FIG. 4 illustrates the distance information map generated for the first image. The distance calculator 310 represents distance information from a short distance to a long distance using gray levels 0 through 255 to allow a user to readily comprehend the distance information map. An object located at the longest distance is displayed as a black color using gray level 0, and an object located at the shortest distance is displayed as a white color using gray level 255.

Figure 5:
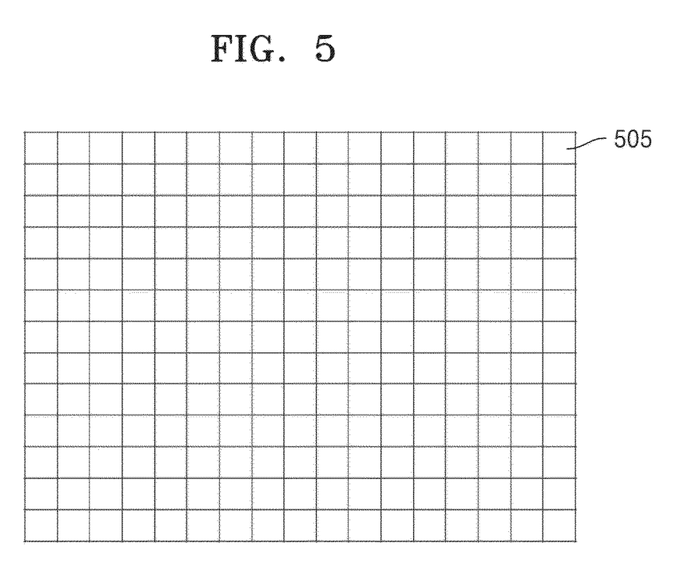
FIG. 5 is a diagram showing a detection data block.

In addition, the camera 1 sets up detection data blocks to perform a fast AF/auto white balance (AWB)/AE. The detection data blocks are obtained by dividing an image frame into a plurality of blocks and averaging RGB values of pixels existing in each of the plurality of blocks. It is possible to reduce the amount of calculations during performing of the AF/AWB/AE algorithm using the detection data blocks. An example of detection data blocks 505 is illustrated in FIG. 5.

The first image is divided into a plurality of blocks, and a RGB average value of pixels existing in each block is stored in each block.

Figure 6:
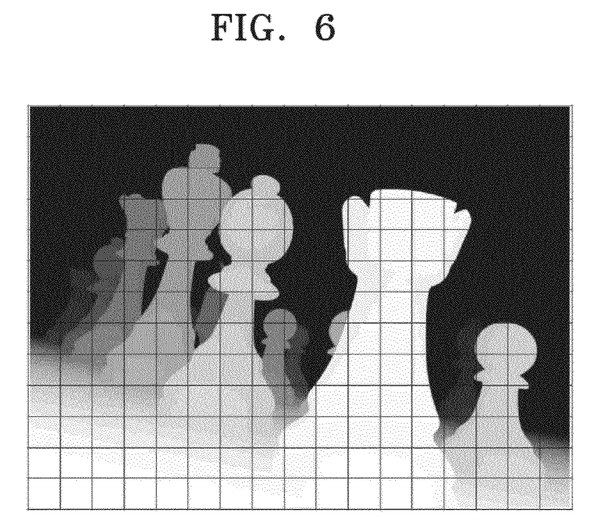
FIG. 6 is a diagram illustrating an example in which a detection data block is matched to distance information of an object represented using gray levels.

The matching unit 320 generates three-dimensional (3D) detection data blocks by matching distance information to the RGB information of the detection data blocks. FIG. 6 illustrates an example in which the first image, of which the distance information is expressed using gray levels as illustrated in FIG. 4, is matched to the detection data blocks of the first image.

Figure 7:
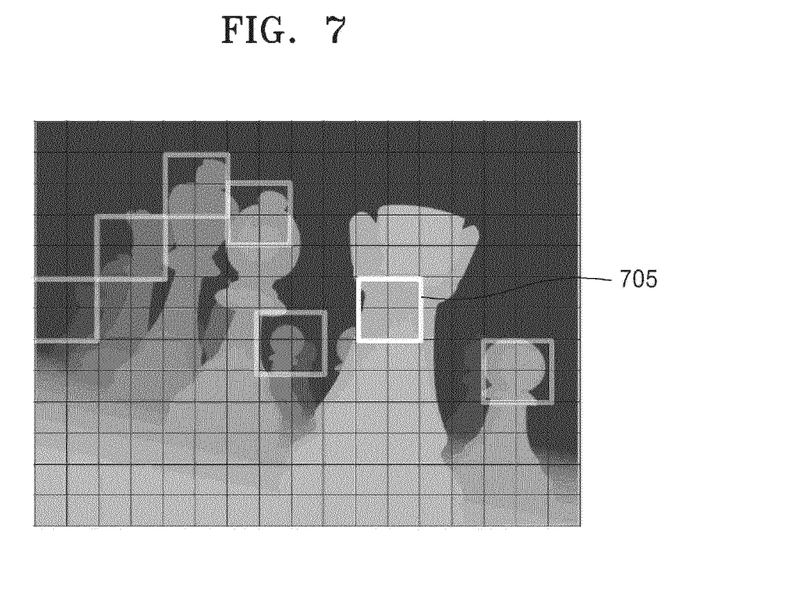
FIG. 7 is a diagram illustrating an example in which a plurality of AF candidate areas are indicated in FIG. 6.
Figure 8:
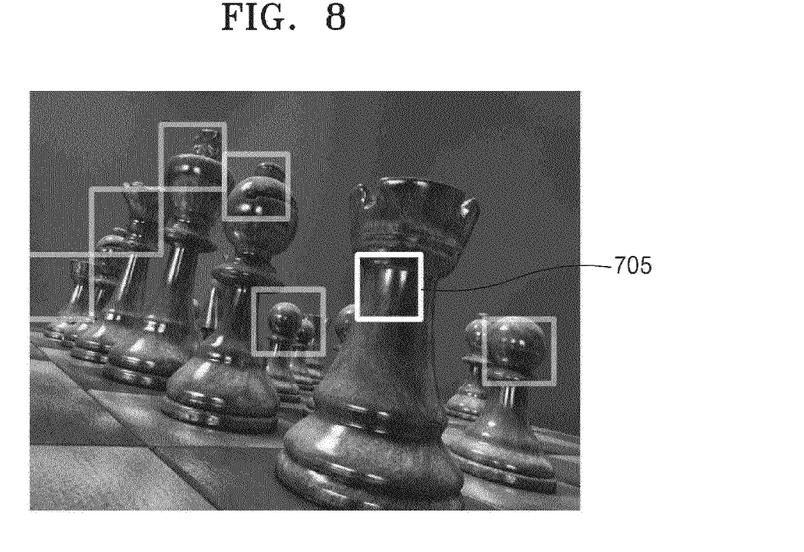
FIG. 8 is a diagram illustrating an example in which a plurality of AF candidate areas are indicated in a live-view image.

The generation and display unit 330 generates a plurality of AF candidate areas from the image of FIG. 6 in which the distance information is matched to the RGB information of the detection data blocks, and outputs the plurality of AF candidate areas to the display unit 420. The generated plurality of AF candidate areas are illustrated in FIG. 7. The plurality of AF candidate areas are indicated on an image obtained by mixing the first image and the second image. That is, although the plurality of AF candidate areas are generated using the first image, the generated plurality of AF candidate areas are indicated on the image obtained by mixing the first image and the second image. In FIG. 8, the plurality of AF candidate areas indicated on the image obtained by mixing the first and second images are illustrated.

The generation and display unit 330 generates the plurality of AF candidate areas based on sizes of objects and distances to the objects, and grants priorities in descending order from an AF candidate area including an object that has the largest size and to which a distance is shortest to an AF candidate area including an object that has the smallest size and to which a distance is longest. An AF candidate area 705 having a first (e.g., highest) priority is displayed using a color different from that of the other AF candidate areas. FIG. 8 shows that the color of the AF candidate area 705 having the first priority is different from that of the other AF candidate areas.

The controller 340 captures an image centered on any one of the plurality of AF candidate areas when the photographing button is pressed. The controller 340 captures an image using any one of the plurality of AF candidate areas using one of two methods.

Figure 9A:
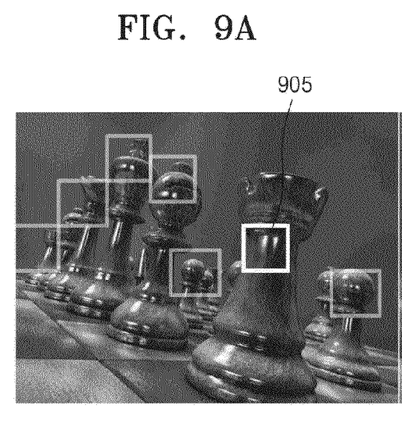
FIG. 9A illustrates an example in which an AF operation is performed centered on an AF candidate area having a first priority when a first shutter release button is pressed.
Figure 9B:
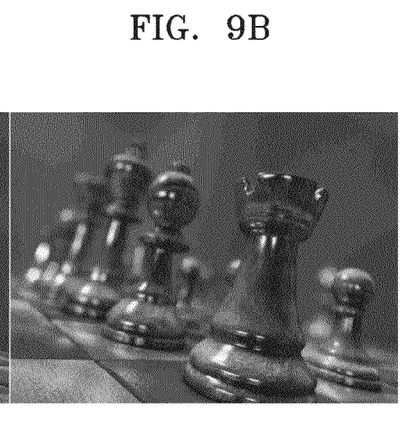
FIG. 9B shows an image captured when a second shutter release button is pressed after performing an AF operation centered on an AF candidate area having a first priority.

In a first method, the controller performs an AF operation centered on an AF candidate area having a first priority when the first shutter release button is pressed, and captures an image when the second shutter release button is pressed. FIG. 9A illustrates an example in which an AF operation is performed centered on an AF candidate area 905 having a first priority when the first shutter release button is pressed. FIG. 9B shows an image captured when the second shutter release button is pressed after performing the AF operation centered on the AF candidate area 905 having the first priority.

Figure 10A:
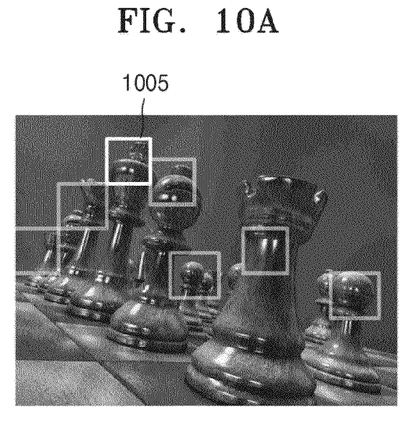
FIGS. 10A and 10B illustrate examples in which an AF candidate area other than an AF candidate area having a first priority from among a plurality of AF candidate areas is selected.
Figure 10B:
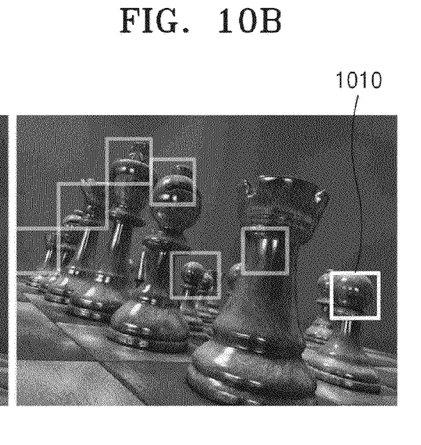

In a second method, the controller 340 receives information about a selection of any one of a plurality of AF candidate areas displayed on the display unit 420. The user may select a desired AF candidate area using the input unit 410 included in the camera 1. FIGS. 10A and 10B illustrate examples in which respective AF candidate areas 1005, 1010 other than the AF candidate area 905 having the first priority from among a plurality of AF candidate areas is selected. The selected AF candidate area 1005, 1010 is displayed with a color different from that of unselected AF candidate areas. When selection of an AF candidate area by the user is finished, the controller 340 receives a first shutter release input signal that is generated when the first shutter release button is pressed by the user. The controller 340 performs an AF operation centered on the selected AF candidate area 1005, 1010 when the first shutter release input signal is received, and captures a corresponding image when the second shutter release button is pressed.

In this manner, it is possible to obtain an accurate photographing result intended by the user by displaying and photographing an AF candidate area using a matching between a distance information map of first and second images and detection data blocks.

Methods of controlling a digital photographing apparatus according to embodiments of the invention are explained with reference to FIGS. 11 and 12. The method may be performed in a digital photographing apparatus such as that illustrated in FIG. 1, and a main algorithm of the method may be performed in the DSP 300 with help of peripheral components.

Figure 11:
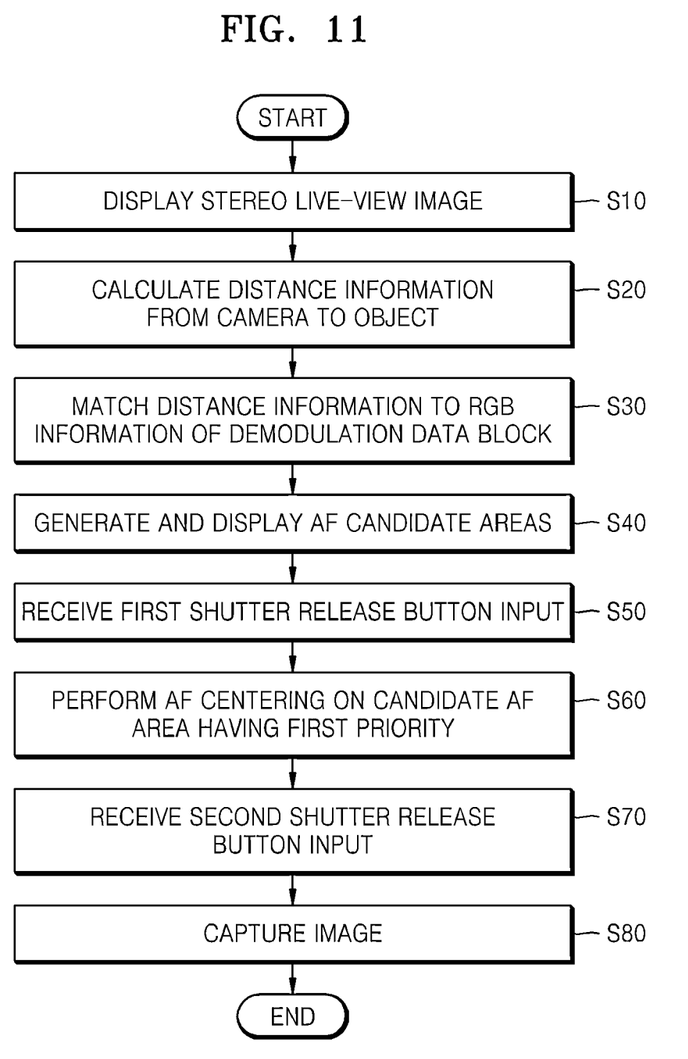
FIG. 11 is a flowchart illustrating a method of controlling the digital photographing apparatus of FIG. 1, according to an embodiment of the invention.

FIG. 11 is a flowchart illustrating a method of controlling the digital photographing apparatus of FIG. 1, according to an embodiment of the invention.

Referring to FIG. 11, the DSP 300 receives a power on signal of the camera 1 from a user and then displays a stereo matched live-view image on the display unit 420 (operation S10).

When the stereo matched live-view image is displayed on the display unit 420, the DSP 300 calculates distance information of an object existing in an image (operation S20). The image may be an image obtained by mixing first and second images input through the first and second lenses 111 and 112, or may be an image input through any one of the first and second lenses 111 and 112. The DSP 300 generates a distance information map by calculating the distance information, and displays the distance information from a short distance to a long distance using gray levels 0 through 255 to allow a user to readily understand the distance information map. An object located at the longest distance is displayed as a black color using gray level 0, and an object located at the shortest distance is displayed as a white color using gray level 255.

Next, the DSP 300 generates 3D detection data blocks by matching distance information to RGB information of detection data blocks (operation S30). The detection data blocks are obtained by dividing an image frame into a plurality of blocks, and averaging RGB values of pixels existing in each of the plurality of blocks. It is possible to reduce the amount of calculations during performing of an AF/AWB/AE algorithm using the detection data blocks. The DSP 300 includes the distance information in the RGB information of the detection data blocks.

When the 3D detection blocks are generated, the DSP 300 generates a plurality of AF candidate areas from the 3D detection data blocks, and then outputs the plurality of AF candidate area to the display unit 420 (operation S40). The DSP 300 generates the plurality of AF candidate areas based on sizes of objects and distances to the objects, and grants priorities in descending order from an AF candidate area including an object that has the largest size and to which a distance is shortest to an AF candidate area including an object that has the smallest size and to which a distance is longest. An AF candidate area having a first (e.g., highest) priority is displayed using a color different from that of the other AF candidate areas.

Subsequently, the DSP 300 receives a first shutter release button input from the user (operation S50).

When the first shutter release button input is received, the DSP 300 performs an AF operation centered on the AF candidate area having the first priority (operation S60).

When the AF operation is finished, the DSP 300 receives a second shutter release button input from the user (operation S70) and then captures an image centered on the AF candidate area having the first priority (operation S80).

Figure 12:
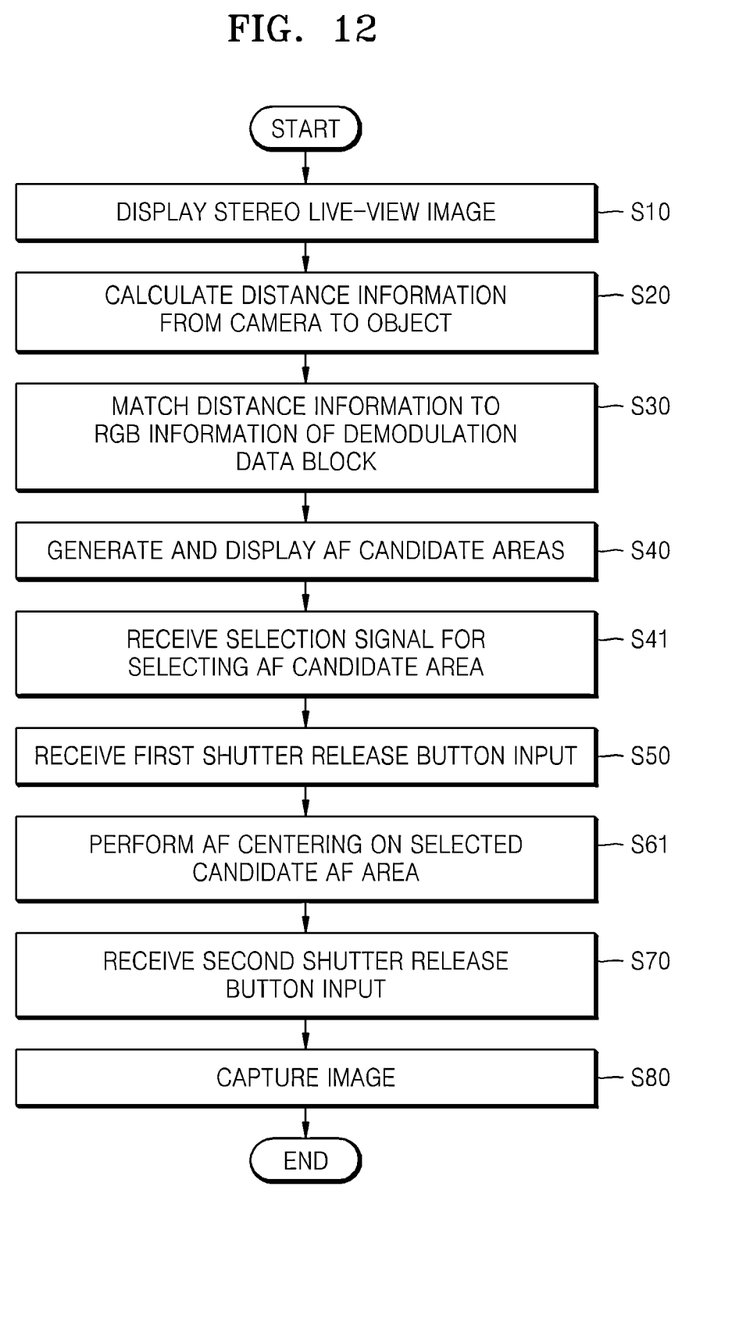
FIG. 12 is a flowchart illustrating a method of controlling the digital photographing apparatus of FIG. 1, according to another embodiment of the invention.

FIG. 12 is a flowchart illustrating a method of controlling the digital photographing apparatus of FIG. 1, according to another embodiment of the invention. Below, explanations that overlap with those of FIG. 11 are partially omitted.

Referring to FIG. 12, the DSP 300 receives a power on signal of the camera 1 from a user, and then displays a stereo matched live-view image on the display unit 420 (operation S10).

When the stereo matched live-view image is displayed on the display unit 420, the DSP 300 calculates distance information of an object existing in an image (operation S20).

When the calculation of distance information is finished, the DSP 300 generates 3D detection data blocks by matching distance information to RGB information of detection data blocks (operation S30).

When the 3D detection data blocks are generated, the DSP 300 generates a plurality of AF candidate area from the 3D detection data blocks, and then outputs the plurality of AF candidate area to the display unit 420 (operation S40).

Next, the DSP 300 receives a selection signal for selecting an AF candidate area from the user (operation S41). In the embodiment of FIG. 11, an AF candidate area having a first priority is automatically selected. However, in the current embodiment, the user may select an area on which the user wishes to perform an AF operation.

Next, the DSP 300 receives a first shutter release button input from the user (operation S50).

When the first shutter release button input is received, the DSP 300 performs an AF operation centered on the AF candidate area selected by the user (operation S61).

When the AF operation is finished, the DSP 300 receives a second shutter release button input from the user (operation S70) and then captures an image centered on the AF candidate area selected by the user (operation S80).

In this manner, it is possible to obtain an accurate photographing result intended by a user by displaying and photographing an AF candidate area using a matching between a distance information map of first and second images and detection data blocks.

The invention can also be embodied as computer-readable codes on a computer-readable recording medium. The computer-readable recording medium is any data storage device that can store data that can be thereafter read by a computer system.

For example, the embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

While digital photographing apparatuses, methods, and articles of manufacture have been particularly shown and described with reference to exemplary embodiments thereof, it will be understood by those of ordinary skill in the art that various changes in form and details may be made therein without departing from the spirit and scope of this disclosure.

What is claimed is:

1. A method of controlling a digital photographing apparatus, the method comprising:
   calculating information about a distance to an object existing in an image stereoscopically input through a first lens and a second lens;
   displaying the distance information by changing a color of the object existing in the image according to the distance information;
   matching the information about the distance to red green blue (RGB) information of the image;
   displaying a plurality of auto focus (AF) candidate areas on the image based on the matched RGB information; and
   capturing an image focused on an AF candidate area having a first priority when a photographing button is pressed.

2. The method of claim 1, further comprising obtaining the image by mixing first and second images input respectively through the first and second lenses.

3. The method of claim 1, wherein the displaying the distance information comprises displaying the distance information from a short distance to a long distance using gray levels 0 through 255.

4. The method of claim 1, wherein the matching of the information about the distance to the RGB information of the image comprises:
   dividing the image into a plurality of blocks;
   calculating RGB average values of pixels existing in each of the plurality of blocks; and
   including the information about the distance in the RGB average values of the pixels.

5. The method of claim 1, wherein the displaying of the plurality of AF candidate areas comprises displaying the plurality of AF candidate areas on the image obtained by mixing first and second images input respectively through the first and second lenses.

6. The method of claim 1, wherein the displaying of the plurality of AF candidate areas comprises generating the plurality of AF candidate areas based on sizes of objects and distances to the objects.

7. The method of claim 6, further comprising assigning priorities in descending order from an AF candidate area including an object that has the largest size and to which a distance is shortest to an AF candidate area including an object that has the smallest size and to which a distance is longest.

8. The method of claim 7, wherein an AF candidate area having the first priority is displayed differently from the other AF candidate areas.

9. A method of controlling a digital photographing apparatus, the method comprising:
   calculating information about a distance to an object existing in an image stereoscopically input through a first lens and a second lens;
   displaying the distance information by changing a color of the object existing in the image according to the distance information;
   matching the information about the distance to red green blue (RGB) information of the image;
   displaying a plurality of auto focus (AF) candidate areas on the image based on the matched RGB information;
   receiving a selection of any one of the displayed plurality of AF candidate areas; and
   capturing an image focused on the selected AF candidate area when a photographing button is pressed.

10. The method of claim 9, further comprising obtaining the image by mixing first and second images input respectively through the first and second lens.

11. The method of claim 9, wherein the displaying the distance information comprises displaying the distance information from a short distance to a long distance using gray levels 0 through 255.

12. The method of claim 9, wherein the displaying of the plurality of AF candidate areas comprises displaying the plurality of AF candidate areas on the image obtained by mixing first and second images respectively input through the first and second lenses.

13. The method of claim 9, wherein the matching of the information about the distance to the RGB information of the image comprises:
   dividing the image into a plurality of blocks;
   calculating RGB average values of pixels existing in each of the plurality of blocks; and
   including the information about the distance in the RGB average values of the pixels.

14. The method of claim 9, wherein the displaying of the plurality of AF candidate areas comprises generating the plurality of AF candidate areas based on sizes of objects and distances to the objects.

15. The method of claim 14, further comprising assigning priorities in descending order from an AF candidate area including an object that has the largest size and to which a distance is shortest to an AF candidate area including an object that has the smallest size and to which a distance is longest.

16. The method of claim 15, wherein an AF candidate area having the first priority is displayed differently from the other AF candidate areas.

17. A digital photographing apparatus comprising:
- a distance calculator to calculate information about a distance to an object existing in an image stereoscopically input through a first lens and a second lens and display the distance information by changing a color of the object existing in the image according to the distance information;
- a matching unit to match the information about the distance to red green blue (RGB) information of the image;
- a generation unit to generate a plurality of auto focus (AF) candidate areas from the image based on the matched RGB information and then for displaying the plurality of AF candidate areas; and
- a controller to capture an image focused on any one of the plurality of AF candidate areas when a photographing button is pressed.

18. The digital photographing apparatus of claim 17, wherein the distance calculator displays the distance information from a short distance to a long distance using gray levels 0 through 255.

19. The digital photographing apparatus of claim 17, wherein the generation unit generates the plurality of AF candidate areas based on sizes of objects and distances to the objects, and assigns priorities in descending order from an AF candidate area including an object that has the largest size and to which a distance is shortest to an AF candidate area including an object that has the smallest size and to which a distance is longest.

20. The digital photographing apparatus of claim 17, wherein the controller captures an image focused on an AF candidate area having a first priority when a photographing button is pressed, or when the photographing button is pressed after any one of the displayed AF candidate areas is selected, the controller captures an image focused on the selected AF candidate area.

* * * * *